(12) United States Patent
Melin

(10) Patent No.: US 6,277,022 B1
(45) Date of Patent: Aug. 21, 2001

(54) VENTILATION SYSTEM FOR A VEHICLE

(75) Inventor: Sven-Anders Melin, Södertälje (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/601,428

(22) PCT Filed: Nov. 30, 1999

(86) PCT No.: PCT/SE99/02224

§ 371 Date: Aug. 1, 2000

§ 102(e) Date: Aug. 1, 2000

(87) PCT Pub. No.: WO00/35694

PCT Pub. Date: Jun. 22, 2000

(30) Foreign Application Priority Data

Dec. 3, 1998 (SE) .................................................. 9804180

(51) Int. Cl.[7] ...................................................... B60H 1/26
(52) U.S. Cl. ............................. 454/75; 454/105; 454/141
(58) Field of Search ............................... 454/75, 76, 105, 454/141, 162, 164, 165; 236/49.3

(56) References Cited

U.S. PATENT DOCUMENTS 2,319,002 * 5/1943 Kramer ................................ 454/141
4,062,273 12/1977 O'Connor .
4,742,760 5/1988 Horstman et al. .
5,261,855 11/1993 Law et al. .
5,779,536 7/1998 Mc Corkel et al. ............. 454/141 X

FOREIGN PATENT DOCUMENTS

748836 * 7/1933 (FR) ..................................... 454/141
4-287711 * 10/1992 (JP) ..................................... 454/900

* cited by examiner

*Primary Examiner*—Harold Joyce
(74) *Attorney, Agent, or Firm*—Ostrolenk, Faber, Gerb & Soffen, LLP

(57) ABSTRACT

An arrangement for ventilation of a space in a vehicle incorporating at least one first outlet device (6) for discharge of air from the space and at least a second outlet device (7) for discharge of air from the space. The first outlet device (6) is arranged at a higher position than the second outlet device (7). Means (10, 11) are designed to allow discharge of air from the space in such a way that a main portion of the air discharged flows through the first outlet device (6) when the temperature of an environment is relatively high and that the main portion of the air discharged flows through the second outlet device (7) when the temperature of the environment is relatively low.

15 Claims, 2 Drawing Sheets

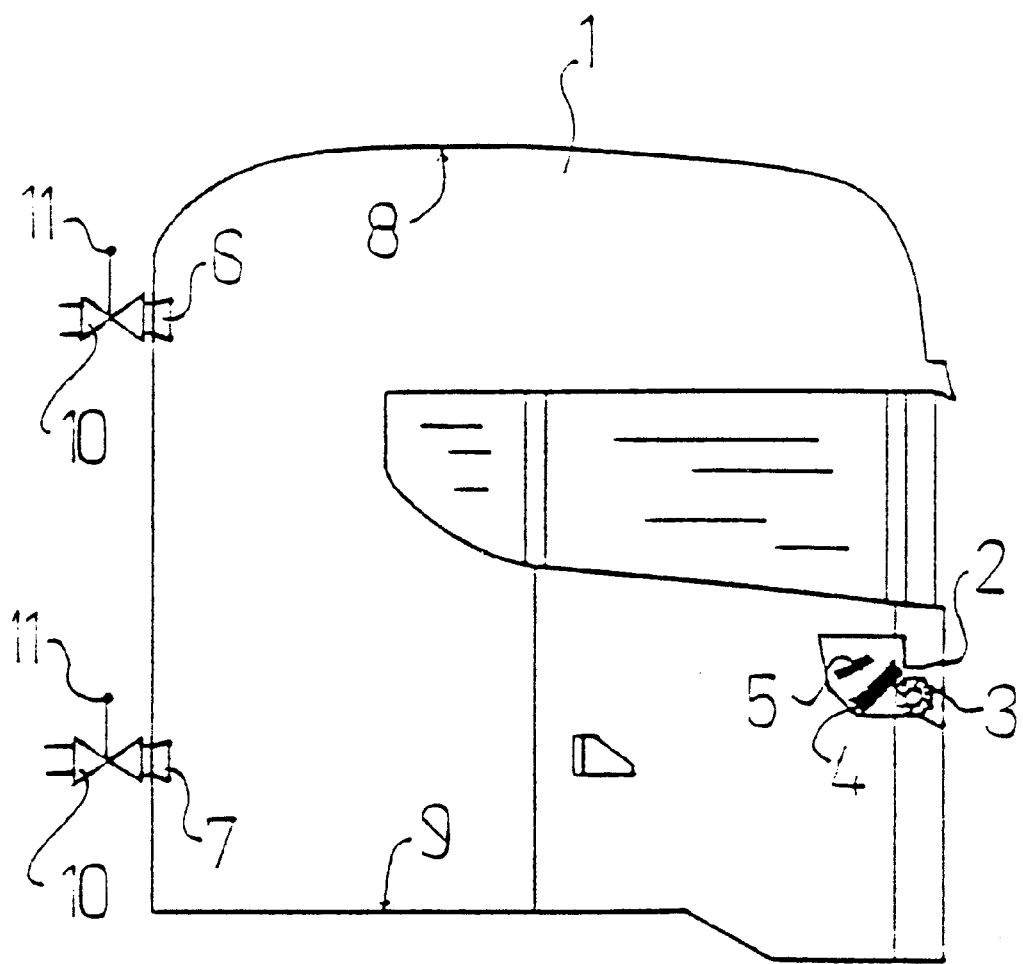

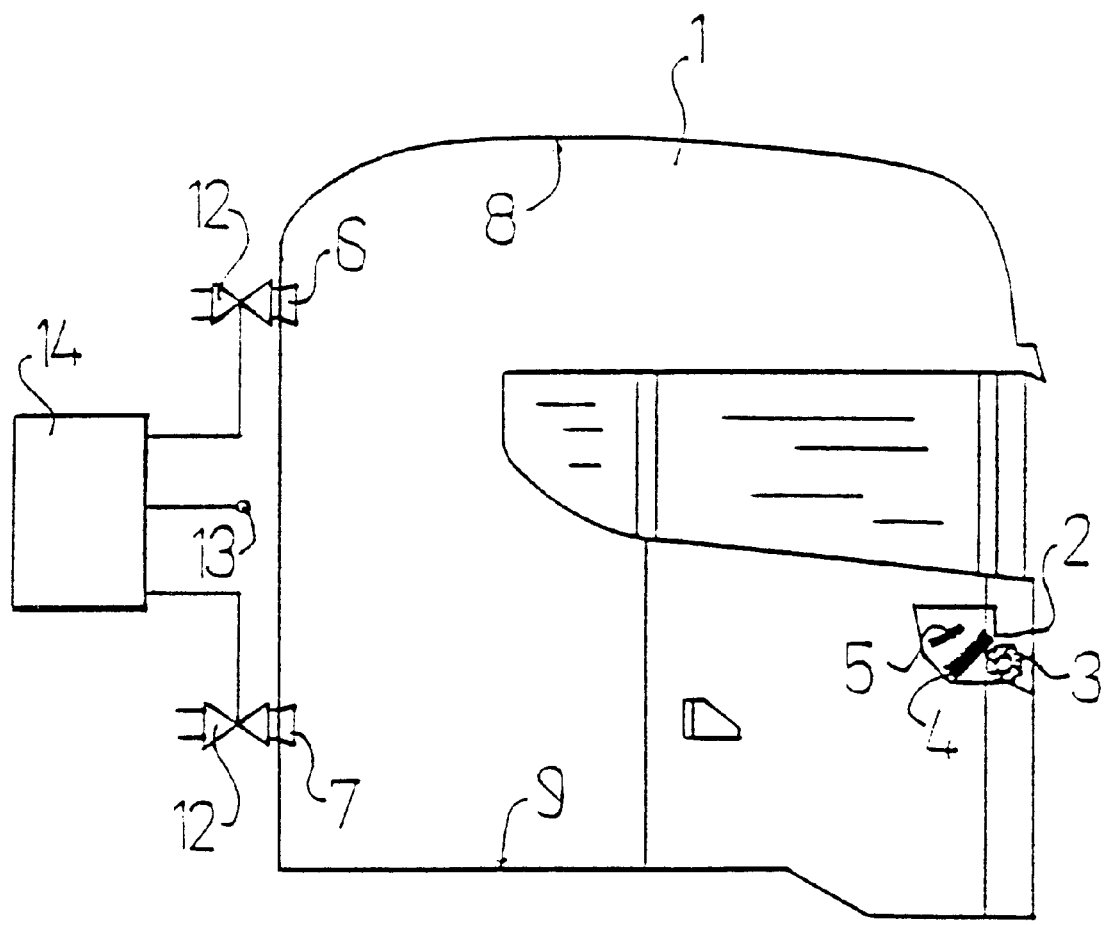

VENTILATION SYSTEM FOR A VEHICLE

BACKGROUND TO THE INVENTION, AND STATE OF THE ART

The present invention relates to an arrangement for ventilation of a space in a passenger compartment of a vehicle to selectively take in or discharge heated or cooled air depending upon ambient conditions.

A known practice is to introduce fresh air into the passenger compartment of vehicles via an inlet in the front wall of the compartment whereby the fresh air passes over a heating element and/or cooling element and is heated or cooled, depending on the ambient temperature. Air from the passenger compartment is released via outlets arranged in the vehicle's doors or in a rear end of a cab of a truck. This means that air which has been heated or cooled is discharged, thereby further increasing the respective need for heating or cooling of the inlet air.

Modem diesel engines operate at very high efficiency, which means that the engine generates relatively little waste heat, which can be utilised for heating the passenger compartment. In some cases it has been necessary, in smaller vehicles such as private cars, to provide extra heating units to meet the passenger compartment heating requirement in low ambient temperatures.

It should also be noted that the cooling required at high ambient temperatures reduces not insubstantially the power available from the vehicle's engine.

U.S. Pat. No. 4,062,273 refers to a ventilation arrangement for a rail vehicle. This known ventilation arrangement includes outlet devices arranged in a lower portion of a passenger space of the rail vehicle and an outlet device which extends from the passenger space through the roof of the rail vehicle.

SUMMARY OF THE INVENTION

The object of the present invention is to increase the effectiveness of the heating and cooling of the passenger space in a vehicle.

This object is achieved by the arrangement indicated in the introduction which is characterised by means designed to allow discharge of air from the space in such a way that a main portion of the air discharged flows through a first outlet device when the temperature of an environment is relatively high and that the main portion of the air discharged flows through a second outlet device when the temperature of the environment is relatively low.

Since warm air rises, relatively warm air in the passenger compartment will be discharged via the upper outlet device when the outside temperature is relatively high, and relatively cool air via the lower outlet device when the outside temperature is relatively low. In this way it is possible in accordance with the present invention to increase the fresh air supply for a given heating or cooling effect or to reduce the heating or cooling for a given fresh air supply.

The setting of the first outlet device and the second outlet device may be done either manually, in which case the driver who does the manual setting preferably has access to the prevailing outside temperature, or automatically. This may involve a detection device designed to detect the temperature of the environment.

According to one embodiment of the invention, said means may be designed to open said first outlet device when the temperature of the environment rises above a first level and to open said second outlet device when the temperature of the environment falls below a second level.

According to a further embodiment of the invention, the second level in such cases is higher than the first level. This means that both of the outlet devices will open when the ambient temperature has a substantially normal average value. It also prevents both of the outlet devices closing simultaneously and hence makes it possible to maintain a maximum supply of fresh air.

According to a further embodiment of the invention, said means are designed to close said second outlet device when the temperature of the environment rises above the second level and further to close said first outlet device when the temperature of the environment falls below the first level.

According to a further embodiment of the invention, said means include a first thermostatically controlled valve of said first outlet device and a second thermostatically controlled valve of said second outlet device. Such a thermostatically controlled valve can easily be designed to open/close the outlet device at a desired temperature level. This means that there is no need of any complicated control equipment for implementing the present invention. Another embodiment of the invention includes in said means a control unit which is connected to said first outlet device and said second outlet device. The control unit may further be connected to said detection device and designed to open said first outlet device and said second outlet device on the basis of the temperature detected.

Advantageously, said first outlet device is arranged in the vicinity of a ceiling of the space and said second outlet device in the vicinity of a floor of the space.

BRIEF DESCRIPTION OF THE DRAWINGS

The present invention will now be explained in more detail by means of various embodiments, which are only intended as examples, and with reference to the attached drawings.

FIG. 1 depicts a cab of a vehicle with an arrangement according to a first embodiment of the invention.

FIG. 2 depicts a cab for a vehicle with an arrangement according to a second embodiment of the invention.

DETAILED DESCRIPTION OF VARIOUS EMBODIMENTS OF THE INVENTION

FIG. 1 depicts a vehicle cab I for a truck or some similar utility vehicle. Although the invention is now described in connection with a truck, it should be noted that it is also applicable to other types of vehicle, e.g. cars, buses, rail vehicles etc.

The vehicle, of which only the cab 1 is depicted, incorporates at least one inlet device 2 which is designed to supply fresh air to the interior space of the cab 1. The inlet device 2 incorporates a fan 3 or similar air supply device, a cooling element 4 and a heating element 5. The fan 3 thus provides a flow of fresh air which flows through a passage in the inlet device 2, passing the cooling element 4 and the heating element 5 in such a way that the fresh air can be cooled and heated by the respective elements 4, 5. The cooling element 4 forms part of a conventional air conditioning arrangement and the heating element 5 likewise forms part of a conventional heating arrangement in a vehicle. It should be noted that the vehicle might incorporate more than one inlet device 2 for supply of fresh air to the interior space.

The vehicle further incorporates at least one first outlet device 6 designed to allow discharge of air from the interior space defined by the cab 1, and at least one second outlet device 7 likewise designed to allow discharge of air from the interior space. The vehicle may incorporate more than one first outlet device 6 and more than one second outlet device 7 for discharge of air from the interior space, but the invention will hereinafter be described with only one first outlet device 6, one second outlet device 7 and one inlet device 2, for the sake of simplicity.

The first outlet device 6 is situated at a higher position than the second outlet device 7 and, more precisely, the first inlet device 6 is arranged in the vicinity of a ceiling 8 of the interior space, while the second outlet device 7 is arranged in the vicinity of a floor 9 of the interior space.

Since warm air is lighter than cool air, the temperature of the air in the vicinity of the ceiling 8 of the interior space will be higher than the temperature in the vicinity of the floor 9. In accordance with the invention, means are arranged for allowing discharge of air from the first outlet device 6 when the temperature of the environment is relatively high, and via the second outlet device 7 when the temperature of the environment is relatively low. This means that when it is warm outside the cab 1 the relatively warm air in the vicinity of the roof 8 of the interior space is discharged, and when it is cold outside the cab I the relatively cold air situated in the vicinity of the floor 9 of the interior space is discharged.

With the object of achieving such selective discharge of air from the interior space, the first outlet device 6 incorporates a valve 10 designed to open the outlet device 6 when the ambient temperature rises above a first level, and the second outlet device 7 incorporates a valve 10 designed to open the second outlet device 7 when the ambient temperature falls below a second level. At the same time, the first level is preferably higher than the second level, which means that at least one out of the first outlet device 6 and the second outlet device 7 will always be open.

According to a first embodiment of the invention, said valves 10 are thermostatically controlled in that each valve 10 incorporates a thermostat 11 which may for example include a bimetallic device designed to effect the opening and closing of the valve 10 at the respective first and second temperature levels. Such thermostats 11, which detect the ambient temperature, thus control the first outlet device 6 and the second outlet device 7 independently of one another and automatically, i.e. without the vehicle driver having to take any action to effect selective discharge of air from the interior space.

The second embodiment differs from the first in that the thermostatic valves 10 are replaced by control valves 12. A further feature of the second embodiment is that a temperature detection device 13 is arranged to detect the temperature of the environment, i.e. the air temperature outside the cab 1. The detection device 13 and the two control valves 12 are connected to a control unit 14 which is designed to initiate opening of the control valve 12 of the first outlet device 6 when the ambient temperature rises above said first level, and to open the control valve 12 of the second outlet device 7 when the ambient temperature falls below said second level. Here again the first level is preferably higher than the second level. The functioning of the arrangement according to the invention is thus substantially the same in both of the embodiments depicted. The first temperature level and the second temperature level are also preferably the same in both embodiments, although the first embodiment provides an easy way, by means of the control unit 14, of setting the first level and the second level respectively according to individual wishes.

According to a third embodiment, not depicted in either drawing, the valves 10, 12 may be replaced by manually adjustable valves which can be opened and closed respectively by means of two control devices readily accessible to the driver. According to this embodiment, the respective outlet devices 6 and 7 are thus controlled manually by the driver, while at the same time he preferably has access to a display device which provides him with information on the prevailing ambient temperature.

The invention is not limited to the embodiment described above but may be varied and modified within the scopes of the patent claims below.

What is claimed is:

1. An arrangement for ventilating a space in a vehicle, wherein the space is defined by an enclosure, the arrangement comprising
   an inlet for air into the enclosure;
   a first outlet device located higher on the enclosure for discharge of air from the enclosure;
   a second outlet device and located at a lower position below the first outlet device also for discharge of air from the enclosure;
   air outlet control devices connected with the first and second outlet devices for permitting discharge of air from the space through the first and second outlet devices, the control devices being operable such that at least a main portion of the air discharged from the space is discharged through the first outlet device when the temperature of the environment around the enclosure is relatively higher and so that the at least the main portion of the air discharged from the space is discharged through the second outlet device when the temperature of the environment around the enclosure is relatively lower.

2. The arrangement of claim 1, further comprising a temperature detection device for detecting the temperature of the environment outside the enclosure and connected with the control devices for operating the control devices for controlling of discharge of air through the first and second outlet devices.

3. The arrangement of claim 2, wherein each of the first and second outlet devices is openable to let air to pass through, and the control device is operable to open the first outlet device automatically to permit exit of air from the space when the detected temperature of the environment is relatively higher and to open the second outlet device automatically to permit exit of air from the space when the detected temperature of the environment is relatively lower.

4. The arrangement of claim 3, wherein the control devices open the second outlet device only after the temperature of the environment has been detected to have fallen below a second level.

5. The arrangement of claim 4, wherein the control devices close the second outlet device when the temperature of the environment has been detected to have risen above the second level.

6. The arrangement of claim 3, wherein the control devices open the first outlet device only after the temperature of the environment has been detected to have risen above a first level.

7. The arrangement of claim 6, wherein the control devices close the first outlet device when the temperature of the environment has been detected to have fallen below the first level.

8. The arrangement of claim 6, wherein the control devices open the second outlet device only after the temperature of the environment has been detected to have fallen below a second level.

9. The arrangement of claim 8, wherein the second temperature level is higher than the first temperature level.

10. The arrangement of claim 2, wherein the detection device and the control devices comprise a first thermostatistically controlled valve, which detects temperature of the environment around the enclosure and is for selectively opening the first outlet device and comprises a second thermostatistically controlled valve which detects temperature of the environment around the enclosure and is for selectively opening the second outlet device.

11. The arrangement of claim 2, wherein the control devices are connected to the first and second outlet devices and are operated to selectively permit exit of air from the space past the first outlet device and past the second outlet device.

12. The arrangement of claim 11, wherein the control devices are connected to the temperature detection device and the control devices are operable for opening the first and the second outlet devices based on the temperature detected by the detection device.

13. The arrangement of claim 1, wherein the enclosure has a ceiling above and a floor below, and the first outlet device is arranged near the ceiling and the second outlet device is arranged near the floor of the enclosure of the space.

14. The arrangement of claim 1, further comprising an inlet device for inlet of supply of air to the space in the enclosure.

15. The arrangement of claim 14, further comprising devices operable for selectively heating or cooling the air entering the space through the inlet device.

* * * * *